United States Patent [19]

Seitzer

[11] 3,723,298

[45] Mar. 27, 1973

[54] HYDROGENATION WITH A Y TYPE ZEOLITE-ARSENIC CATALYST

[75] Inventor: Walter H. Seitzer, West Chester, Pa.

[73] Assignee: Sun Research and Development Co., Philadelphia, Pa.

[22] Filed: Apr. 29, 1971

[21] Appl. No.: 138,750

[52] U.S. Cl...........208/143, 208/254 H, 208/DIG. 2, 252/455 Z, 252/456
[51] Int. Cl. .............................................C10g 23/02
[58] Field of Search.....208/143, 111, DIG. 2, 254 H; 260/667, 683.9

[56] References Cited

UNITED STATES PATENTS

| 3,140,253 | 7/1964 | Plank et al............................208/143 |
| 3,197,398 | 7/1965 | Young..................................208/143 |
| 3,248,316 | 4/1966 | Barger et al. .........................208/111 |

Primary Examiner—Herbert Levine
Attorney—George L. Church, Donald R. Johnson, Wilmer F. McCorquodale, Jr. and Paul Lipsitz

[57] ABSTRACT

Hydrogenation of a mineral oil containing aromatic hydrocarbons by use of a hydrogenation catalyst comprised of a Y-zeolite containing arsenic.

3 Claims, No Drawings

HYDROGENATION WITH A Y TYPE ZEOLITE-ARSENIC CATALYST

It is known in the art to effect hydrogenation of mineral oils containing aromatic hydrocarbons so as to obtain products of lower boiling range; e.g., materials in the gasoline range. For example, U. S. Pat. No. 3,197,398 (D. A. Young, issued July 27, 1965) discloses such a process where the catalyst used is a molecular sieve of the X, Y, or L crystal type containing a Group VIII metal. It is also known to the skilled art worker in the field of catalystic hydrogenation that arsenic acts as a poison or inhibitor of a large number of catalysts in numerous types of reactions. In the text "Catalysis" by Berkman, Morrell, and Egloff (Reinhold, 1940) it is reported at page 393 that arsenious oxide "due to its reduction to arsine, is a strong poison for catalytic hydrogenation with platinum as catalyst."

It has now unexpectedly been found, however, that hydrocarbons such as mineral oil containing aromatic components are effectively hydrogenated to a hydrocarbon composition of less aromaticity and greater saturation by use of a hydrogenation catalyst consisting of a Y type zeolite molecular sieve which contains arsenic or a combination of arsenic with iron, cobalt, or zinc.

The catalysts of this invention may be employed for the hydrogenation of substantially any mineral oil fraction boiling above the conventional gasoline range, i.e., above about 300°F., and usually above about 400°F., and having an end-boiling-point up to about 1,000°F., but preferably not greater than about 850°F. These feedstocks may be sulfur-free, or they may contain up to about 5 percent by weight of sulfur, in the form of organic sulfur compounds. They may also contain organic nitrogen compounds. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling-point between about 400° and 650°F., an API gravity between about 30° and 35°, and containing at least about 20 percent by volume of aromatic hydrocarbons.

Hydrogenation conditions to be employed in the process of the invention will be within the following ranges:

|  | Operative | Preferred |
| --- | --- | --- |
| Temperature, °C. | 200–460 | 260–400 |
| Pressure, p.s.i.g. | 400–5,000 | 750–2,000 |
| H./oil ratio, s.c.f./B | 1,000–15,000 | 2,000–10,000 |

The arsenic containing catalyst, as indicated, is prepared from commercially available Y-type molecular sieves. The Y molecular sieves having crystal pore diameters of about 9 to 10 A, and wherein the $SiO_2/Al_2O_3$ ratio is about 4–6, are preferred. The catalyst is prepared from the ammonium form of the sieve which may be obtained by treating the hydrogen form with ammonium chloride and then washing with water until chloride ions are no longer present. The ammonium form of the molecular sieve is then treated with an aqueous solution of arsenic pentoxide at elevated temperature (about 85°–95°C.) for several hours and then filtered and dried at about 150°C. During this treatment arsenic is absorbed on the zeolite surface. The catalyst is further heated at about 400°C. for about 1 to 3 hours to effect activation.

The amount of arsenic on the molecular sieve may vary from about 1 percent to about 15 percent by weight, preferably about 5 to 10 percent. The amount of arsenic on the support is readily controlled by the amount of arsenic pentoxide in the aqueous treating medium and by the time of treatment, which techniques are known in the art.

As indicated above, the arsenic containing molecular sieve catalyst may also have present iron, cobalt, or zinc. The arsenic and iron combination results in a more active hydrogenation catalyst. The combination of arsenic with cobalt or zinc, although not more active for hydrogenation than arsenic alone, is desirable for use with high nitrogen containing feeds as these combinations significantly lower the nitrogen content in the hydrogenated products. It is of interest to note that combinations of arsenic with certain other metals are detrimental to hydrogenation. For example, arsenic in combination with molybdenum, a known promoter for hydrogenation catalysts, shows significantly less hydrogenation activity than molybdenum alone. Thus, the known high specificity of catalytic action is clearly in evidence. When using combinations of arsenic with cobalt, zinc, or iron the amounts of these metals present on the catalyst will be from about 1 percent to about 15 percent, preferably, 3 to 7 percent. Like the arsenic, they are put on the catalyst from an aqueous solution of their water soluble salts.

In order to further illustrate the invention the following examples are given.

EXAMPLE 1

A commercial Y zeolite (Linde–SK–40) was treated three times with an aqueous solution of ammonium chloride at 80°C. for one-half hour and then washed with water until free of chloride. Then, 150 grams of the ammonium zeolite was then stirred in a solution of 25g. of arsenic pentoxide in 450 ml. of water at 90°C. for 16 hours. The solids were filtered off and heated in a rotating furnace at about 400°C. for 2 hours.

One part by weight of catalyst and 5 parts of a slurry oil, (a petroleum fraction boiling at 550° to 950°F. and containing 1.3 percent sulfur) were placed in a stirred batch reactor, heated to 400°C. and pressured to 2,500 p.s.i.g. with hydrogen. A drop in hydrogen pressure to 1,300 p.s.i.g. indicated that hydrogenation had occurred. The product oil contained 14 percent by volume of lighter boiling distillate (below 430°F.)

EXAMPLE 2

A catalyst was prepared as in Example 1 except that iron was incorporated with the arsenic by exchanging 50 grams of the arsenic-ammonium Y zeolite with a solution of 40 grams of ferrous chloride in 300 ml. water at 90°C. for 4 hours, filtering, drying, and heat treated as in Example 1. The slurry oil was similarly hydrogenated at 400°C. and the amount of hydrogen absorbed was equivalent to 3,600 p.s.i.g. Over 20 percent by volume of the product distilled below 430°F.

When the hydrogenation was repeated using a similar catalyst, but free of arsenic, hydrogen absorption was only an amount equivalent to 1,700 p.s.i.g.

EXAMPLE 3

Example 2 was repeated at 430°C., but using an anthracene oil (a coal tar distillate containing 1 percent nitrogen and 0.65 percent sulfur) instead of slurry oil. The hydrogen absorption using the catalyst with arsenic was 34 percent higher than with the catalyst containing iron only.

EXAMPLE 4

A catalyst was prepared from a Y-type molecular sieve as in Example 1 by treating 50 grams of the arsenic pentoxide-impregnated ammonium Y zeolite with a solution of 15 grams of zinc nitrate in 200 ml. water at 90°C. for 4 hours, and then filtering, drying and heat-treating at 400°C. for 2 hours.

Using this catalyst for hydrogenation of anthracene oil at 430°C. temperature, an amount of hydrogen uptake equivalent to 3,300 p.s.i.g. was observed. When using a similar catalyst containing zinc, but without the arsenic, the hydrogen uptake measured was only 1,100 p.s.i.g. Another significant advantage for the arsenic containing catalyst in this instance is that it resulted in a product having less than 0.02 percent nitrogen whereas the run with the arsenic free catalyst gave a product having 0.30 percent nitrogen.

EXAMPLE 5

Using a catalyst of a Y-type molecular sieve prepared as in Example 2 but containing cobalt instead of iron, hydrogenation of anthracene oil was carried out to give 14 percent by volume of a liquid product distilling below 430°F. The liquid product distilling above 430°C. contained 0.20 percent sulfur and 0.10 percent nitrogen. When the hydrogenation was repeated using a similar cobalt Y zeolite catalyst free of arsenic, slightly more hydrogen was absorbed, but the liquid product distilling above 430°F. contained 0.27 percent sulfur and 0.22 percent nitrogen.

It is clear from the above examples of the invention that the Y-type zeolite containing arsenic is an effective catalyst for hydrogenation. It is also significant that combinations of arsenic with iron result in increased hydrogenation activity, and combination of arsenic with zinc or cobalt result in significant nitrogen removal from the petroleum oil hydrogenated.

The invention claimed is:

1. A hydrogenating process for a mineral oil fraction boiling above about 300°F. whereby nitrogen content of the oil is reduced, which comprises contacting said fraction with hydrogen under hydrogenation conditions and in the presence of a catalyst composition consisting essentially of a Y-type zeolite having associated therewith from 1 percent to 15 percent by weight of arsenic and from 1 to 15 percent by weight of cobalt or zinc.

2. The process of claim 1 where the catalyst contains of from 5 to 10 percent arsenic and from 3 to 7 percent cobalt.

3. The process of claim 1 where the catalyst contains of 5 to 10 percent arsenic and 3 to 7 percent zinc.

* * * * *